United States Patent [19]
Kreisinger et al.

[11] Patent Number: 5,534,765
[45] Date of Patent: Jul. 9, 1996

[54] BATTERY WITH MEMORY FOR STORING CHARGE PROCEDURE

[75] Inventors: Robert D. Kreisinger; Arthur G. Burns; Jose M. Fernandez, all of Plantation, Fla.

[73] Assignee: Motorola, Inc., Schaumburg, Ill.

[21] Appl. No.: 495,370

[22] Filed: Jun. 28, 1995

Related U.S. Application Data

[63] Continuation of Ser. No. 26,657, Mar. 5, 1993, abandoned.

[51] Int. Cl.⁶ .................................................... H01M 10/48
[52] U.S. Cl. .................................................. 320/30; 320/48
[58] Field of Search ........................................ 320/2, 145, 21, 320/39, 48, 31, 30

[56] References Cited

U.S. PATENT DOCUMENTS

| | | | |
|---|---|---|---|
| 5,363,031 | 11/1994 | Miller et al. | 320/21 |
| 5,371,453 | 12/1994 | Fernandez | 320/5 |
| 5,463,305 | 10/1995 | Koenck | 320/21 |

*Primary Examiner*—Peter S. Wong
*Assistant Examiner*—Edward Tso
*Attorney, Agent, or Firm*—Mansour M. Ghomeshi; Kenneth M. Massaroni

[57] ABSTRACT

A battery charger system (100) is provided which includes a charger (110) for supplying charge current and voltage and a battery (120) having a memory (122) for storing charge parameters. The charge parameters comprise battery related information instructing for battery charging. The battery related information stored in the memory (122) may include charge instructions instructing the charger of procedure for charging the battery (122).

2 Claims, 1 Drawing Sheet

BATTERY WITH MEMORY FOR STORING CHARGE PROCEDURE

This is a continuation of application Ser. No. 08/026,657, filed Mar. 5, 1993 now abandoned.

TECHNICAL FIELD

This invention relates in general to rechargeable batteries and battery chargers and more specifically, to operative rechargeable battery systems for facilitating battery charging.

BACKGROUND

Portable devices routinely depend upon batteries as a power source. To ease battery replacement costs, rechargeable batteries have found wide utility in powering contemporary consumer and business products. For example, nickel cadmium (Ni—Cad) batteries may be repeatedly used to energize computers, radios, pagers, and other such devices. As is well known, rechargeable batteries may be readily reenergized after use (i.e., after discharge) via a battery charger.

Depending on their chemistry, rechargeable batteries come in many varieties with each battery type requiring its own charging procedure. Such varieties include lead acid battery, Ni—Cad and Nickel Metal Hydride. For example, a lead acid battery requires a constant voltage charge procedure where the battery voltage is maintained constant throughout the charging process. On the other hand a Ni—Cad battery requires a constant current charging procedure where the charge current supplied to the battery is maintained constant. Also, at the same time, a Ni—Cad battery charging procedure differs from a Nickel Metal Hydride (Ni—MH) battery, in that, the battery voltage at which the charging process is stopped is different for a Ni—Cad battery than it is for a Ni—MH battery. Furthermore, the battery charging procedure may be dependent on non-chemical parameters, such battery capacity and the battery cell temperature. Battery capacity informs the charger as to how much current should be supplied to the battery. For example, the charger would provide a charge current at a substantially higher charge rate to a battery having 1600 mAHour capacity than to one having 900 mAHour capacity. The cell temperature, among other things, informs the charger when to stop charging to avoid battery explosion. Generally, the temperature information are relayed to the battery via a thermistor positioned near the battery cells.

More advanced battery packages utilize a memory device for storing certain battery related information. Koeneck in the U.S. Pat. No. 4,737,702 discloses a battery charging control system in which a memory device positioned in a battery pack stores information relating to operational history of the battery. Also, U.S. Pat. No. 4,387,344 issued to Loper discloses a battery monitor circuit for monitoring and storing in a memory device, digital data representing the power supplied by a battery.

Conventionally, the charging procedure is implemented via hardware or software in the charger itself. Charging procedure may be implemented through the charger hardware or it may be implemented through software by programming a microprocessor controlled charger. In modern microprocessor controlled chargers, a permanent storage medium, such as a Read-only-Memory (ROM), stores firmware containing instructions or procedure for charging the battery. For example, the constant voltage (or constant current) charging procedure may be programmed into the charger memory, and the charger controller executes the procedure to charge the battery.

However, with immense variety in charging procedures, a dilemma facing battery system manufacturers is the need for developing chargers to meet various charging requirements. This need has increased charger's development cost, design cycle time as well as its manufacturing cost.

Therefore, there is a need for a flexible battery charging system which allows for charging batteries with various charge requirements.

SUMMARY OF THE INVENTION

Briefly, according to the invention, a battery capable of being charged by an external charger includes at least one battery cell and a memory device. The memory device stores charge parameters which are necessary for the charger to commence charging the battery cells once the charger retrieves the charge parameters. The charge parameters comprise information instructing the charger of the charge procedure.

DETAILED DESCRIPTION OF THE PREFERRED EMBODIMENT

Figure 1:
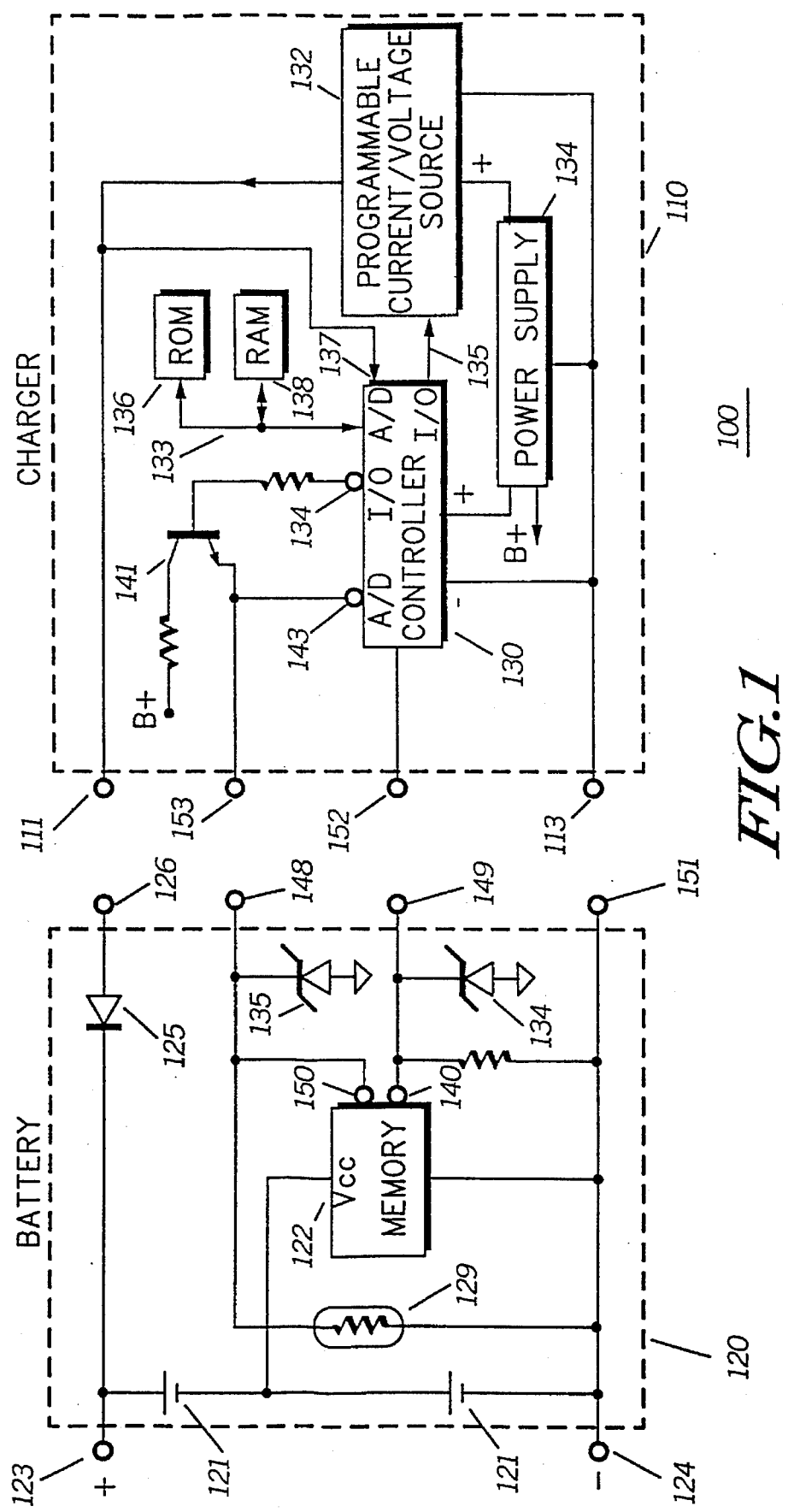
FIG. 1 is a schematic diagram of the battery charger system having a charger and a battery package according to the present invention.

While the specification concludes with claims defining the features of the invention that are regarded as novel, it is believed that the invention will be better understood from a consideration of the following description in conjunction with the sole drawing figure, in which like reference numerals are carried forward.

Referring now to FIG. 1, a battery charger system 100 is shown to include a charger 110 for providing charge current to a rechargeable battery 120. The battery 120 includes a plurality of rechargeable battery cells 121 which receive the charge current through a battery port 126 when the battery 120 is placed in the charger 110. The battery 120 interfaces with the charger 110 through battery ports 126, 148, 149 and 151 and the charger ports 111, 153, 152 and 113 The battery cells 121 are coupled to ports 123 and 124 and provide the energy from the battery to an external device (not shown). A diode 125 is coupled between the battery port 126 and the battery cells 121 to prevent cell discharge through the charger circuitry.

The battery 120 includes a memory device 122 which as described later in detail stores charge parameters necessary for commencing to charge the battery cells 121. The memory is powered by tapping one or more cells 121 to provide the memory supply voltage Vcc. The memory 122 is a EEPROM memory, such as a NM24CO memory device series manufactured by National Semiconductor capable of serially exchanging data based on I$^2$C two-wire protocol specification as is well known in the art. The memory 122 includes two memory terminals: data terminal 140 and clock terminal 150. The data terminal 140 is a serial data terminal and the clock terminal 150 is a synchronization clock terminal both of which are used for communicating memory signals between an external microprocessor and the memory 122. As shown, a Zener diode 134 protects the terminal 149 from undesired high voltage potentials. The data terminal 140 is coupled to the battery port 152 which allows for transfer of data between the battery 120 and the charger 110. The battery 120 includes a thermistor 129 for providing a battery temperature signal through the battery port 148. The battery port 148 is also coupled to the clock terminal 150 and protected by a Zener diode 135. In order to reduce the number of needed battery ports, the battery port 148 is used as a common port for exchanging the battery temperature signal and the memory clock signals in a multiplexed manner.

According to the present invention, the memory 122 stores charge parameters comprising information necessary for the charger 110 to commence charging the battery 120. In one embodiment, the charge parameters comprise instructions informing the charger 110 of the procedure for charging the battery 110. The instructions stored in the memory 122 are specific to the battery 120 and are in accordance with charging requirements of the battery cells 121. When the battery is placed in the charger 110, the charger 110 retrieves the stored charge instructions from the memory 122 and based on the instructions proceeds to charge the battery 120. As such, the charger 110 behaves as a universal charger capable of charging batteries of various type and with specific charging requirements based on battery resident charging procedure.

The charger 110 includes a controller 130 for controlling charger operation and a programmable current/voltage supply 132 for providing the charge current and voltage to the battery 120. The controller 130 can be microprocessor, such as the 68000 family of microprocessors manufactured by Motorola Inc., having among other things a central processing unit CPU, memory, input-output (I/O) ports, and a number of analog-to-digital (A/D) ports. The programmable current/voltage supply 132 is responsive to a control signal form the controller 130 in a well known manner for controlling the supply of charge current and voltage to the battery 120. In response to a control signal 135, the programmable current/voltage supply 132 may commence, increase, decrease, or terminate the supply of the charge current and voltage. As such, the supply of charge current and voltage may be fashioned according to a specific charging requirements. For example, the charge current or the charge voltage supply may be stepped, tapered, or maintained constant during the charge process. Both the controller 130 and the programmable current/voltage source 132 are powered by a power supply 134 which provides a charger supply voltage B+.

The controller 130 communicates via an address bus and data buss (shown collectively as line 133) with suitable amount of read-only-memory (ROM) 136 and random access memory (RAM) 138. Preferably, the controller 130's operational instructions reside in the ROM 136, while the temporary information may be stored in the RAM 138. The controller 130 is programmed in a well-known manner to exchange serial data with the memory 122 through the charger port 152 and clock signals through the port 153. The charger port 152 and 153 respectively couple to the battery ports 149 and 148 when the battery is placed in the charger 121. The content of the memory 122 may be retrieved by applying a clock signal to the memory port 150. As described previously, the charger 121 exchanges the clock signal and the battery temperature signal in multiplexed manner. When exchanging data with the battery 120, the controller 130 provides a clock signal to the memory 122 a transistor switch 141. The transistor switch is biased via B+voltage to act as a switch which applies the clock signal as generated at controller I/O port 134 to the charger port 153. Under this condition, the clock signal provided by the controller 130 is coupled to the clock terminal of the memory 122. The battery port 153 also act as the port for receiving the temperature signal from the battery 120. The battery port 153 is coupled to an A/D port 143 for sampling the temperature signal provided by the thermistor 129. When the battery temperature needs to be acquired, the controller 130 turns off the transistor switch 141 to allow the controller 130 receive battery temperature signal, thus allowing the charger 110 to determine the battery temperature. The controller 130 includes a D/A port 137 which is coupled to the battery port 120. Thus, if the controller 130 needs to determine the voltage across the battery, the voltage present at the D/A port 137 is sampled.

Operationally, with no battery in the charger 110, the controller 130 initializes all the charging parameters and erases the content of RAM 138. Then, the controller 130 periodically transmits a well known data-read command to the memory 122 until a response is received. Upon reception of the response, the controller 130 determines that the battery 120 is placed in the charger 110. Then, the controller performs a memory retrieve whereby the stored information (i.e., charging procedure) in the memory 122 are transferred into the charger 110 and are stored in the RAM 138. After completing the information exchange, the charger 110 charges the battery 120 according to the charging procedure stored in the memory 122. The stored procedure may comprise instructions and commands understandable by the controller 130 under a predefined battery operating procedure. The battery operating procedure of the present invention comprise program algorithms for effectuating any number of charging procedure. Basically, the charging procedures stored in the battery memory 122 comprise higher level software commands which are transformed via the battery operating systems (which is stored in the ROM) into lower level commands understandable by the controller 130's machine language. The low level commands setup the I/O ports and the A/D ports to input or output various signals for effectuating a particular charging procedure. For example, if certain steps of a battery charging procedure requires reading battery temperature, a high level executed "read temperature" command causes the controller 130 to turn off the transistor 141 and adapt the controller port 143 to sample the temperature signal provided by the thermistor 129. Also, based on the commands stored in the battery memory 122, the supply of the charge current and voltage to the battery may be adapted to be stepped, tapered or constant by controlling the control signal 135. As such, the charge current and voltage supplied by the current supply 132 is controlled by the controller 130 based upon information provided by the memory 122.

Once the battery is removed from the charger 110, the controller 130 determines absence of the battery when the serial communication with the battery is no longer possible. At that time, the content of the RAM are erased until a new battery is placed in the charger 110.

In another embodiment, the charge parameters stored in the memory 120 may comprise information relating to the safety features of the battery 120. Some batteries need to be charge according to standards set forth by various governmental and/or non-governmental agencies. Therefore, the information stored in the memory 122 may comprise charge parameters relating to the safety feature of the battery. These parameters instruct the charger as to the voltage level and charge capacity required under these standards. In yet another, the memory 122 may provide the controller with necessary information relating to manufacturing information, sales information and quality information. These information may include manufacturing site information, point of sale, model number, serial number and an array of other information necessary before charging the battery 120 is commenced. The controller 130 processes the received battery data and gets ready to charge the battery accordingly.

As described above, the present invention provides a highly flexible battery charger system. By storing the charge procedure in the battery a single charger platform can be used to charge batteries having various charging requirements. Therefore, the development cost and design cycle time of the battery charger is substantially reduced as the charger hardware and software is no longer dependent upon the battery charging procedure.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charging system, comprising:
   a battery charger for charging a rechargeable battery package, the rechargeable battery package having a memory with charging instructions stored therein, the charging instructions including high level software commands that provide the battery charger with a particular charging procedure that must be used in charging the rechargeable battery package; the battery charger including:
   means for retrieving the charging procedure from said battery memory;
   a current supply for providing charge current to the rechargeable battery package; and
   a controller responsive to the means for retrieving to direct the current supply to supply charge current to the rechargeable battery package in accordance with the charging procedure retrieved therefrom.

2. A battery charging system for charging a plurality of different types of rechargeable battery cells, comprising:
   a battery charger having a memory, a power supply, and a controller device therein;
   a rechargeable battery including:
   at least one rechargeable battery cell; and
   a memory having stored therein charging algorithms unique to said at least one battery cell, said charging algorithms being transformed via battery operating system stored in said battery charger memory into commands understandable by said controller, for controlling said power supply.

* * * * *